United States Patent
Li et al.

(10) Patent No.: US 10,425,779 B2
(45) Date of Patent: Sep. 24, 2019

(54) POWER-ADAPTIVE SIDELINK DATA TRANSMISSIONS

(71) Applicant: QUALCOMM Incorporated, San Diego, CA (US)

(72) Inventors: Chong Li, Weehawken, NJ (US); Junyi Li, Chester, NJ (US); Piyush Gupta, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/675,366

(22) Filed: Aug. 11, 2017

(65) Prior Publication Data

US 2018/0176747 A1 Jun. 21, 2018

Related U.S. Application Data

(60) Provisional application No. 62/435,529, filed on Dec. 16, 2016.

(51) Int. Cl.
  *H04W 4/12* (2009.01)
  *H04W 76/14* (2018.01)
  (Continued)

(52) U.S. Cl.
  CPC ......... *H04W 4/12* (2013.01); *H04L 29/08576* (2013.01); *H04L 67/14* (2013.01);
  (Continued)

(58) Field of Classification Search
  None
  See application file for complete search history.

(56) References Cited

U.S. PATENT DOCUMENTS 7,321,580 B1 1/2008 Ramanathan et al.
7,983,230 B1 7/2011 Li et al.
(Continued)

OTHER PUBLICATIONS

Huawei et al., "Sidelink Support & Enhancements for NR", 3GPP Draft; R1-167207, 3rd Generation Partnership Project (3GPP), Mobile Competence Centre; 650, Route Des Lucioles; F-06921 Sophia-Anti Polls Cedex; France, vol. RAN WG1, No. Gothenburg, Sweden; Aug. 12, 2016, XP051142227, Retrieved from the Internet: URL:http://www.3gpp.org/ftp/tsg_ran/WG1_RL1/TSGR1_86/Docs/ [retrieved on Aug. 12, 2016], 7 pages.
(Continued)

*Primary Examiner* — Jianxun Yang
(74) *Attorney, Agent, or Firm* — Holland & Hart LLP

(57) ABSTRACT

Methods, systems, and devices for wireless communication are described. A first UE and a second UE may coordinate to establish a sidelink connection. The first UE may identify data to transmit to the second UE, and the first UE may transmit a request to send (RTS) message to the second UE with a first transmit power. The first UE may then determine to refrain from using the first transmit power for the data transmission, and the first UE may transmit the data to the second UE with a second transmit power that is different from the first transmit power. The UE may determine the second transmit power for the data transmission based on instantaneous channel quality information (CQI) received in a clear to send (CTS) message, a modulation and coding scheme (MCS) selected for the data transmission, a threshold power, etc.

28 Claims, 11 Drawing Sheets

(51) Int. Cl.
| | |
|---|---|
| H04W 74/08 | (2009.01) |
| H04W 52/38 | (2009.01) |
| H04W 52/32 | (2009.01) |
| H04L 29/08 | (2006.01) |
| H04W 52/28 | (2009.01) |
| H04W 52/26 | (2009.01) |
| H04W 52/24 | (2009.01) |
| H04W 52/22 | (2009.01) |
| H04W 52/16 | (2009.01) |
| H04L 25/02 | (2006.01) |
| H04W 92/18 | (2009.01) |
| H04W 52/50 | (2009.01) |

(52) U.S. Cl.
CPC ....... *H04W 52/325* (2013.01); *H04W 52/383* (2013.01); *H04W 74/0816* (2013.01); *H04W 76/14* (2018.02); *H04L 25/0224* (2013.01); *H04L 29/08567* (2013.01); *H04L 67/125* (2013.01); *H04W 52/16* (2013.01); *H04W 52/228* (2013.01); *H04W 52/241* (2013.01); *H04W 52/243* (2013.01); *H04W 52/262* (2013.01); *H04W 52/281* (2013.01); *H04W 52/50* (2013.01); *H04W 92/18* (2013.01)

(56) References Cited

U.S. PATENT DOCUMENTS

| | | | | |
|---|---|---|---|---|
| 2008/0076465 | A1* | 3/2008 | Larsson | H04W 28/18 455/522 |
| 2010/0265862 | A1* | 10/2010 | Choi | H04W 52/143 370/311 |
| 2015/0103789 | A1 | 4/2015 | Tanaka | |
| 2015/0105114 | A1* | 4/2015 | Chou | H04W 4/006 455/509 |
| 2015/0319700 | A1* | 11/2015 | Oteri | H04W 52/28 455/127.1 |

OTHER PUBLICATIONS

International Search Report and Written Opinion—PCT/US2017/062380—ISA/EPO—dated Jan. 30, 2018.
Sony et al., "Relaxation of Test Limits for Open Loop Power Control in the Uplink Test in UE conformance testing (FDD)", 3GPP Draft; T1R000318r1, 3rd Generation Partnership Project (3GPP), Mobile Competence Centre; 650, Route Des Lucioles; F-06921 Sophia-Anti Polls Cedex; France, vol. TWG1, No. Redondo Beach, USA; Nov. 21, 2000, XP050843093, Retrieved from the Internet: URL:http://www.3gpp.org/ftp/tsg_t/WG1_Test/TSGT1_09/Documents/ [retrieved on Nov. 21, 2000], 5 pages.

* cited by examiner

POWER-ADAPTIVE SIDELINK DATA TRANSMISSIONS

CROSS REFERENCES

The present Application for Patent claims priority to U.S. Provisional Patent Application No. 62/435,529 by Li et al., entitled "Power-Adaptive Sidelink Data Transmissions," filed Dec. 16, 2016, assigned to the assignee hereof.

INTRODUCTION

The following relates generally to wireless communication and more specifically to power-adaptive sidelink data transmissions.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously communicating with multiple communication devices, which may be otherwise known as user equipment (UE).

Communication between a base station and a UE may include uplink transmissions from the UE to the base station and downlink transmissions from the base station to the UE. UEs may also communicate with each other over sidelink connections (e.g., device-to-device (D2D) communication). In some cases, a UE may transmit data with a specific transmit power to another UE over a sidelink channel. The UE may determine the transmit power for the data transmission based on a history of channel quality information (CQI) associated with the sidelink connection. However, in some instances, the transmission of data using a transmit power determined from the CQI history may result in unnecessary interference in a wireless communications system and unnecessary power consumption at a UE.

SUMMARY

A method of wireless communication in a wireless communications system is described. The method may include transmitting a request to send (RTS) message with a first transmit power to a receiving device over a sidelink connection with the receiving device, determining to refrain from using the first transmit power for a data transmission, identifying a second transmit power for the data transmission, and transmitting the data transmission with the second transmit power to the receiving device over the sidelink connection with the receiving device.

An apparatus for wireless communication in a wireless communications system is described. The apparatus may include means for transmitting an RTS message with a first transmit power to a receiving device over a sidelink connection with the receiving device, means for determining to refrain from using the first transmit power for a data transmission, means for identifying a second transmit power for the data transmission, and means for transmitting the data transmission with the second transmit power to the receiving device over the sidelink connection with the receiving device.

Another apparatus for wireless communication in a wireless communications system is described. The apparatus may include a processor and memory in electronic communication with the processor. The processor and memory may be configured to transmit an RTS message with a first transmit power to a receiving device over a sidelink connection with the receiving device, determine to refrain from using the first transmit power for a data transmission, identify a second transmit power for the data transmission, and transmit the data transmission with the second transmit power to the receiving device over the sidelink connection with the receiving device.

A non-transitory computer readable medium for wireless communication in a wireless communications system is described. The non-transitory computer-readable medium may include instructions operable to cause a processor to transmit an RTS message with a first transmit power to a receiving device over a sidelink connection with the receiving device, determine to refrain from using the first transmit power for a data transmission, identify a second transmit power for the data transmission, and transmit the data transmission with the second transmit power to the receiving device over the sidelink connection with the receiving device.

Some examples of the method, apparatus, and non-transitory computer-readable medium described above may further include processes, features, means, or instructions for receiving a clear to send (CTS) message from the receiving device in response to the RTS message, where the CTS message includes CQI. Some examples of the method, apparatus, and non-transitory computer-readable medium described above may further include processes, features, means, or instructions for identifying the second transmit power for the data transmission based on the CQI.

Some examples of the method, apparatus, and non-transitory computer-readable medium described above may further include processes, features, means, or instructions for identifying a modulation and coding scheme (MCS) for the data transmission. Some examples of the method, apparatus, and non-transitory computer-readable medium described above may further include processes, features, means, or instructions for identifying the second transmit power for the data transmission based on the MCS. In some examples of the method, apparatus, and non-transitory computer-readable medium described above, the data transmission includes a portion of a larger data transmission.

Some examples of the method, apparatus, and non-transitory computer-readable medium described above may further include processes, features, means, or instructions for identifying a threshold power for the data transmission based on neighboring communications. Some examples of the method, apparatus, and non-transitory computer-readable medium described above may further include processes, features, means, or instructions for identifying the second transmit power for the data transmission based on the identified threshold power. In some examples of the method, apparatus, and non-transitory computer-readable medium described above, the neighboring communications may be associated with a higher priority than the data transmission.

In some examples of the method, apparatus, and non-transitory computer-readable medium described above, the second transmit power may be less than the first transmit power. In some examples of the method, apparatus, and non-transitory computer-readable medium described above, the RTS message includes a reference signal. In some examples of the method, apparatus, and non-transitory computer-readable medium described above, the wireless communications system comprises a millimeter wave (mmW) system. In some examples of the method, apparatus, and non-transitory computer-readable medium described above, the wireless communications system comprises a sub-6 GHz system.

A method of wireless communication in a wireless communications system is described. The method may include receiving an RTS message with a first transmit power from a transmitting device over a sidelink connection with the transmitting device and receiving a data transmission with a second transmit power from the transmitting device over the sidelink connection with the transmitting device, where the second transmit power is different from the first transmit power.

An apparatus for wireless communication in a wireless communications system is described. The apparatus may include means for receiving an RTS message with a first transmit power from a transmitting device over a sidelink connection with the transmitting device and means for receiving a data transmission with a second transmit power from the transmitting device over the sidelink connection with the transmitting device, where the second transmit power is different from the first transmit power.

Another apparatus for wireless communication in a wireless communications system is described. The apparatus may include a processor and memory in electronic communication with the processor. The processor and memory may be configured to receive an RTS message with a first transmit power from a transmitting device over a sidelink connection with the transmitting device and receive a data transmission with a second transmit power from the transmitting device over the sidelink connection with the transmitting device, where the second transmit power is different from the first transmit power.

A non-transitory computer readable medium for wireless communication in a wireless communications system is described. The non-transitory computer-readable medium may include instructions operable to cause a processor to receive an RTS message with a first transmit power from a transmitting device over a sidelink connection with the transmitting device and receive a data transmission with a second transmit power from the transmitting device over the sidelink connection with the transmitting device, where the second transmit power is different from the first transmit power.

Some examples of the method, apparatus, and non-transitory computer-readable medium described above may further include processes, features, means, or instructions for determining CQI based on the RTS message. Some examples of the method, apparatus, and non-transitory computer-readable medium described above may further include processes, features, means, or instructions for transmitting the CQI in a CTS message to the transmitting device. In some examples of the method, apparatus, and non-transitory computer-readable medium described above, the second transmit power may be less than the first transmit power.

In some examples of the method, apparatus, and non-transitory computer-readable medium described above, the RTS message includes a reference signal. In some examples of the method, apparatus, and non-transitory computer-readable medium described above, the wireless communications system comprises an mmW system. In some examples of the method, apparatus, and non-transitory computer-readable medium described above, the wireless communications system comprises a sub-6 GHz system.

DETAILED DESCRIPTION

Some wireless communications systems may support sidelink communication between UEs. Sidelink communication may also be referred to as D2D communication, peer-to-peer (P2P) communication, vehicle-to-vehicle (V2V) communication, vehicle-to-everything (V2X) communication, etc. In some cases, a first UE may identify data to transmit to a second UE over a sidelink connection. The first UE may transmit an RTS message to the second UE that includes information about the data transmission. In some cases, the power used to transmit the RTS message may be determined based on a history of CQI associated with the sidelink connection.

The second UE may then transmit a CTS message to the first UE in response to the RTS message. If the first UE determines that a sidelink channel is clear for a data transmission (e.g., based in part on the CTS message), the first UE may transmit the data to the second UE over the sidelink channel. In some wireless communications systems, the first UE may use the same amount of power that was used to transmit the RTS message to transmit the data. However, in some instances, the transmit power used to transmit the RTS message may not be an appropriate transmit power for the data transmission (e.g., the transmit power may be unnecessarily high). Therefore, if the first UE transmits the data with the same amount of power used to transmit the RTS message, the first UE may waste power and cause unnecessary interference to neighboring communications.

Communication networks (e.g., 5G networks) are being designed to support a significantly greater efficiency than LTE/LTE-A networks. As a result, conventional techniques for transmitting data over a sidelink may not be appropriate for some 5G applications. Techniques described in the present disclosure may enable efficient use of power at a UE and may help to reduce interference in a wireless communications system. Specifically, a UE may transmit data with a different (e.g., lower) transmit power than the power used to transmit an RTS message. The UE may determine the transmit power for the data transmission based on, for example, an instantaneous CQI, a lowered MCS, a threshold power, etc.

Aspects of the disclosure introduced above are described below in the context of a wireless communications system. Examples of processes and signaling exchanges that support power-adaptive sidelink data transmissions are then described. Aspects of the disclosure are further illustrated by and described with reference to apparatus diagrams, system diagrams, and flowcharts that relate to the use of power-adaptive sidelink data transmissions.

Figure 1:
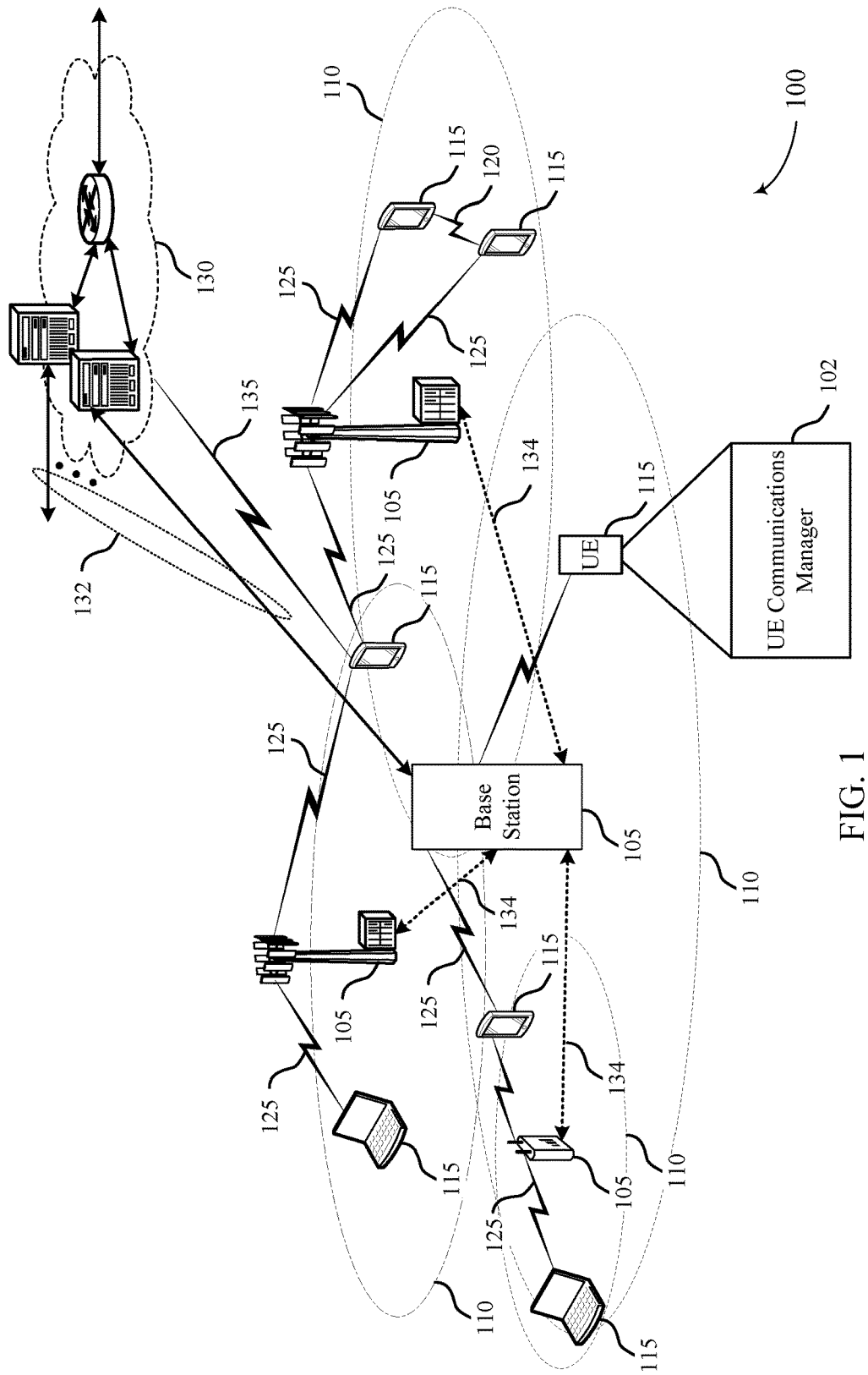
FIG. 1 illustrates an example of a wireless communications system that supports power-adaptive sidelink data transmissions, in accordance with one or more aspects of the present disclosure.

FIG. 1 illustrates an example of a wireless communications system 100 (e.g., a mmW system or a sub-6 GHz system) that supports power-adaptive sidelink data transmissions, in accordance with one or more aspects of the present disclosure. The wireless communications system 100 includes base stations 105 (e.g., gNodeBs (gNBs), and/or radio heads (RHs)), UEs 115, and a core network 130. In some examples, the wireless communications system 100 may be an LTE (or LTE-Advanced) network, or an NR network. In some cases, wireless communications system 100 may support enhanced mobile broadband (eMBB) communications, ultra-reliable (i.e., mission critical) communications, low latency communications, and communications with low-cost and low-complexity devices.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. A UE 115 may communicate with the core network 130 through communication link 135. Control information and data may be multiplexed on an uplink channel or downlink channel according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, an automobile component, a train, a train component, or the like.

One or more of the UEs 115 may include a UE communications manager 102, which may be an example of the communications manager 515, 615, 715, or 815 described with reference to FIGS. 5 through 8. In some cases, UE communications manager 102 may transmit an RTS message with a first transmit power to a receiving device over a sidelink connection with the receiving device, determine to refrain from using the first transmit power for a data transmission, identify a second transmit power for the data transmission, and transmit the data transmission with the second transmit power to the receiving device over the sidelink connection with the receiving device. In other cases, UE communications manager 102 may receive an RTS message with a first transmit power from a transmitting device over a sidelink connection with the transmitting device and receive a data transmission with a second transmit power from the transmitting device over the sidelink connection with the transmitting device, where the second transmit power is different from the first transmit power.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

A base station 105 may be connected by an S1 interface to the core network 130. The core network may be an evolved packet core (EPC), which may include at least one mobility management entity (MME), at least one serving gateway (S-GW), and at least one packet data network (PDN) gateway (P-GW). The MME may be the control node that processes the signaling between the UE 115 and the EPC. All user internet protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service (PSS).

The core network 130 may provide user authentication, access authorization, tracking, IP connectivity, and other access, routing, or mobility functions. At least some of the network devices, such as a base station 105, may include subcomponents such as an access network entity, which may be an example of an access node controller (ANC). Each access network entity may communicate with a number of UEs 115 through a number of other access network transmission entities, each of which may be an example of a smart radio head or a transmission/reception point (TRP). In some configurations, various functions of each access network entity or base station 105 may be distributed across various network devices (e.g., radio heads and access network controllers) or consolidated into a single network device (e.g., a base station 105).

In some cases, wireless communications system 100 may be a packet-based network that operates according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (ARQ) (HARD) to provide retransmission at the MAC layer to improve link efficiency. In the control plane, the Radio Resource Control (RRC) protocol layer may provide establishment, configuration, and maintenance of an RRC connection between a UE 115 and a base station 105. At the Physical (PHY) layer, transport channels may be mapped to physical channels.

HARQ may be a method employed within wireless communications system 100 which may improve the likelihood that data is received correctly over a communication link 125. HARQ may include a combination of error detection (e.g., using a cyclic redundancy check (CRC)), forward error correction (FEC), and retransmission (e.g., ARQ). HARQ may improve throughput at the MAC layer in poor radio conditions (e.g., signal-to-noise conditions). In incremental redundancy HARQ, incorrectly received data may be stored in a buffer and combined with subsequent transmissions to improve the overall likelihood of successfully decoding the data. In some cases, redundancy bits are added to each message prior to a transmission. This may be useful in poor conditions. In other cases, data is retransmitted after the transmitter of the original message receives a negative acknowledgment (NACK) indicating a failed attempt to decode the information. The chain of transmission, response, and retransmission may be referred to as a HARQ process. In some cases, a limited number of HARQ processes may be used for a given communication link 125.

Wireless communications system 100 may utilize both licensed and unlicensed radio frequency spectrum bands. For example, wireless communications system 100 may employ LTE License Assisted Access (LTE-LAA) or LTE Unlicensed (LTE-U) radio access technology or NR technology in an unlicensed band such as the 5 GHz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a carrier aggregation (CA) configuration in conjunction with component carriers (CCs) operating in a licensed band. Operations in unlicensed spectrum may include downlink transmissions, uplink transmissions, and sidelink transmissions. Duplexing in unlicensed spectrum may be based on frequency division duplexing (FDD), time division duplexing (TDD), or a combination of both.

Time intervals in LTE or NR may be expressed in multiples of a basic time unit (which may be a sampling period of $T_s=1/30,720,000$ seconds). Time resources may be organized according to radio frames with a length of 10 ms ($T_f=307200T_s$), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases the subframe may be the smallest scheduling unit, also known as a TTI. In other cases, a TTI may be shorter than a subframe or may be dynamically selected (e.g., in short TTI bursts or in selected component carriers using short TTIs). The frame structure may be the same for uplink transmissions, downlink transmissions, and sidelink transmissions.

A resource element may consist of one symbol period and one subcarrier (e.g., a 15 KHz frequency range). A resource block may contain 12 consecutive subcarriers in the frequency domain and, for a normal cyclic prefix in each orthogonal frequency division multiplexing (OFDM) symbol, 7 consecutive OFDM symbols in the time domain (1 slot), or 84 resource elements. The number of bits carried by each resource element may depend on the modulation scheme (the configuration of symbols that may be selected during each symbol period) selected for a transmission. Further, the ratio of systematic bits (or information bits) to parity bits may depend on the coding scheme selected for the transmission. Thus, the data rate of a transmission may depend on the MCS used for a data transmission.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines.

In some cases, an MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and wireless communications system 100 may be configured to provide ultra-reliable communications for these functions. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Wireless communications system 100 may support direct communication between UEs 115 over a sidelink 120 (e.g., using a P2P or D2D protocol). Sidelink communication may be used for D2D media-sharing, V2V communication, V2X communication, emergency rescue applications, etc. One or more of a group of UEs 115 utilizing D2D communications may be within the geographic coverage area 110 of a cell. Other UEs 115 in such a group may be outside the geographic coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 may facilitate the scheduling of resources for D2D communications. In other cases, D2D communications may be carried out independent of a base station 105.

As an example, a first UE 115 may establish a sidelink connection with a second UE 115. The first UE 115 may identify data to transmit to the second UE 115, and the first UE 115 may transmit an RTS message to the second UE 115. The first UE 115 may determine the power used to transmit the RTS message based on a history of CQI associated with the sidelink 120. After determining that a sidelink channel is clear for the data transmission, the first UE 115 may transmit the data to the second UE 115 with the same transmit power used to transmit the RTS message. However, in some cases, the transmit power used for the RTS message may not be appropriate for the data transmission. For example, the transmit power may be unnecessarily high for the data transmission. As such, the first UE 115 may waste its power and cause unnecessary interference to other transmissions in a wireless communications system.

Wireless communications system 100 may support efficient techniques for communication between UEs 115 over a sidelink connection. In order to limit interference and power consumption, a UE 115 may determine a transmit power for a data transmission that is different from (e.g., less than) a transmit power used for the transmission of an RTS message. The determination of the transmit power for the data transmission may be based on various parameters. In some cases, the UE 115 may determine the transmit power for a data transmission based on instantaneous CQI received in a CTS message. In other cases, the UE 115 may determine the transmit power for a data transmission based on the MCS selected for the data transmission (e.g., lowered MCS). In yet other cases, the UE 115 may determine the transmit power for a data transmission based on an identified threshold power.

Figure 2:
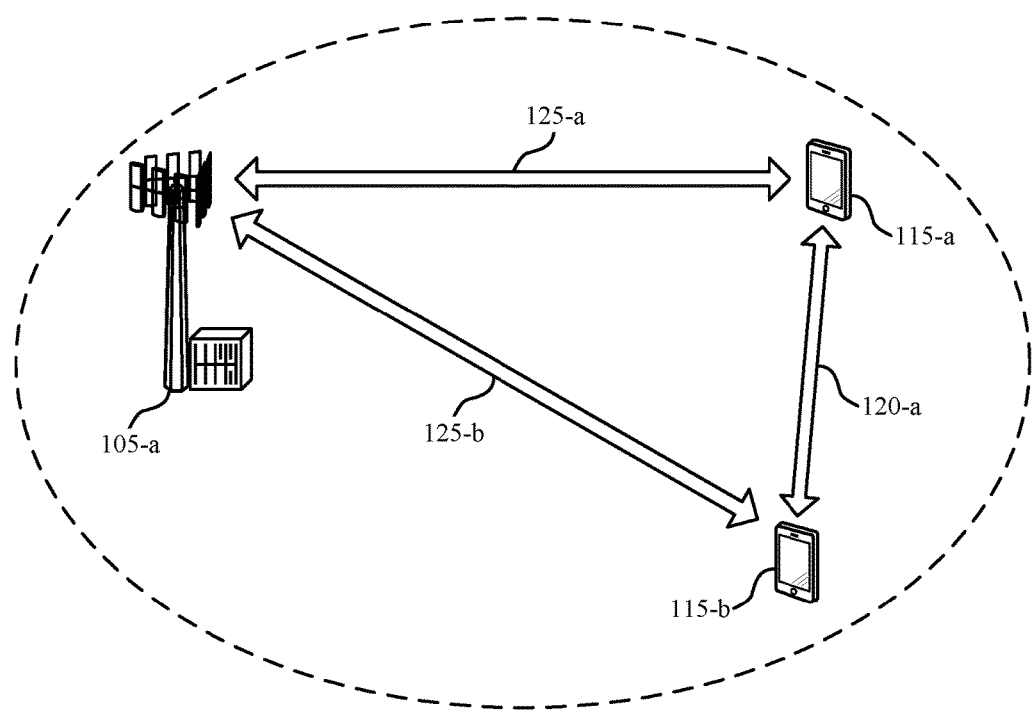
FIG. 2 illustrates an example of a wireless communications system that supports power-adaptive sidelink data transmissions, in accordance with one or more aspects of the present disclosure.

FIG. 2 illustrates an example of a wireless communications system 200 (e.g., a mmW system or a sub-6 GHz system) that supports power-adaptive sidelink data transmissions, in accordance with one or more aspects of the present disclosure. Wireless communications system 200 may include UE 115-*a* and UE 115-*b*, which may be examples of a UE 115 described with reference to FIG. 1. Wireless communications system may also include base station 105-*a*, which may be an example of a base station 105 described with reference to FIG. 1. UE 115-*a* may communicate with base station 105-*a* over communication link 125-*a*, and UE 115-*b* may communicate with base station 105-*a* over communication link 125-*b*. Wireless communications system 200 may support D2D communication between UE 115-*a* and UE 115-*b* over sidelink 120-*a*.

UE 115-*a* may coordinate with UE 115-*b* to establish a connection over sidelink 120-*a*. In this example, UE 115-*a* may be designated as the primary device in the sidelink connection, and UE 115-*b* may be designated as the secondary device in the sidelink connection. Accordingly, data transmissions from UE 115-*a* may have a higher priority than data transmissions from UE 115-*b*. In some cases, UE 115-*a* may identify data to transmit to UE 115-*b*, and UE 115-*a* may transmit an RTS message to UE 115-*b*. UE 115-*a* may identify the transmit power for the RTS message based on a history of CQI associated with sidelink 120-*a*.

The RTS message may include a destination ID, an indication of the duration of the data transmission, and a reference signal to enable channel measurement. The RTS message may also alert other devices (e.g., within range of the sender and receiver) of the data transmission and the priority of the data transmission. UE 115-*b* and other UEs 115 may receive RTS messages from neighboring UEs 115 and may determine whether to refrain from listening for their respective data transmissions since interference from a higher priority data transmission may be high. The process of refraining from listening for data transmissions may be referred to as reception (Rx) yielding. If UE 115-*b* decides to yield to other data transmissions (i.e., refrain from listening for its respective data transmission from UE 115-*a*), UE 115-*b* may also refrain from transmitting a CTS message to UE 115-*a*.

In this example, however, UE 115-*b* may receive the RTS message and determine that UE 115-*a* is clear to transmit over sidelink 120-*a*. Accordingly, UE 115-*b* may transmit a CTS message to UE 115-*a* in response to the RTS message. The CTS message may include a source ID, duration of the data transmission, and a signal-to-interference-plus-noise ratio (SINR) associated with a channel used to transmit the RTS message (e.g., instantaneous CQI). The CTS message may also alert other devices (e.g., within range of the sender and receiver) of the data transmission and the priority of the data transmission. UE 115-*a* and other UEs 115 may receive CTS messages from neighboring UEs 115 and may determine whether to refrain from transmitting their respective data transmissions since interference from a higher priority data transmission may be high. The process of refraining from transmitting data transmissions may be referred to as transmission (Tx) yielding. In some wireless communications systems, UE 115-*a* may use the same amount of power used to transmit the RTS message to transmit the data transmission. However, as described with reference to FIG. 1, utilizing this amount of power may be inefficient.

Wireless communications system 200 may support efficient techniques for identifying a transmit power for the data transmission that is different from (e.g., less than) the transmit power used to transmit the RTS message. In some examples, UE 115-*a* may determine the transmit power for a data transmission based on the instantaneous CQI received in the CTS message from UE 115-*b*. In other examples, UE 115-*a* may identify a low MCS for the data transmission (e.g., if a packet with a small payload size is scheduled for a transmission), and the UE 115-*a* may identify the transmit power for the data transmission based on this MCS. In yet other examples, UE 115-*a* may transmit a portion of a data transmission with less power so as to avoid interfering with higher priority neighboring communications.

UE 115-*a* may also identify the transmit power for the data transmission based on a threshold power. The threshold power may be determined based on higher priority neighboring communications. In some cases, if UE 115-*a* transmits the data at the same power as the RTS message, then the data transmission from UE 115-*a* may interfere substantially with the neighboring communications and may be blocked or suspended by UE 115-*b*. However, if UE 115-*a* transmits at or below a certain (e.g., lower) power (e.g., at or below a Tx yielding threshold power), then the data transmission from UE 115-*a* may not interfere substantially with the neighboring communications. Accordingly, UE 115-*a* may transmit the data with a transmit power at or below the threshold power.

In a first example, an instantaneous CQI received in a CTS message may be better than the expected CQI obtained from the CQI history. Further, UE 115-*a* may have a small amount of data to transmit. As such, a lower MCS may be selected for the data transmission and less power (e.g., relative to the transmit power used for the RTS message) may be used to transmit the data. Consequently, the interference to neighboring communications may be minimized and the amount of power consumed by UE 115-a for the data transmission may also be reduced. In addition, the quality of service (QoS) of the data transmission may not be significantly reduced.

In a second example, a data transmission from UE 115-a may be blocked by higher priority neighboring communications if UE 115-a uses the same transmit power used to transmit the RTS message for the data transmission. Thus, UE 115-a may determine to yield to the higher priority neighboring communications (i.e., Tx yielding). Alternatively, using the techniques described herein, UE 115-a may determine to reduce the transmit power for the data transmission to satisfy the Tx yielding threshold power. Consequently, the data transmission may not interfere substantially with the neighboring communications. In this example, the QoS of the data transmission may be reduced. However, even if the data transmission is not successfully decoded by UE 115-b, portions of the data transmission may be used in an error correction scheme to improve the likelihood that a retransmission of the data is successfully decoded.

Figure 3:
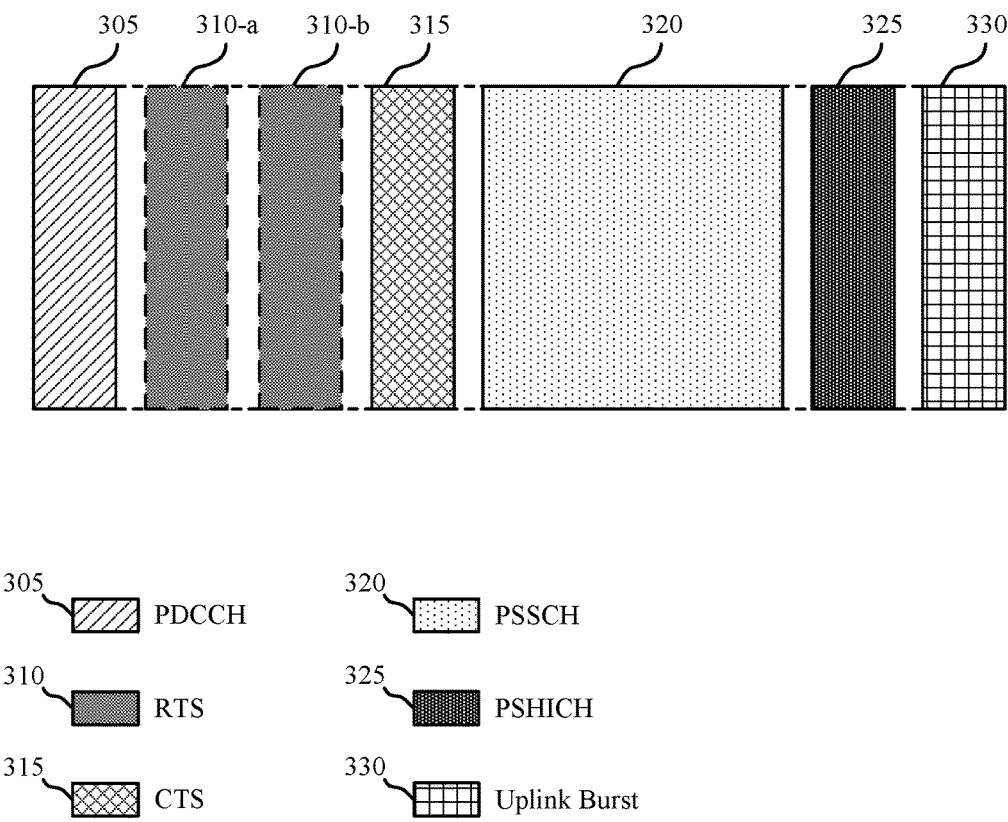
FIG. 3 illustrates an example of a sidelink subframe in a wireless communications system that supports power-adaptive sidelink data transmissions, in accordance with one or more aspects of the present disclosure.

FIG. 3 illustrates an example of a sidelink subframe 300 in a wireless communications system that supports power-adaptive sidelink data transmissions, in accordance with one or more aspects of the present disclosure. Sidelink subframe 300 may include control information received over a physical downlink control channel (PDCCH) 305 from a base station 105, an RTS message 310-a transmitted by a primary device, an RTS message 310-b transmitted by a secondary device (e.g., if the secondary device did not receive the RTS message 310-a), a CTS message 315 transmitted by the primary device or secondary device in response to an RTS message, data transmitted over a physical sidelink shared channel (PSSCH) 320, HARQ signals transmitted over a physical sidelink HARQ indicator channel (PSHICH) 325, and an uplink burst 330.

A first UE 115 may coordinate with a second UE 115 to establish a sidelink connection. In some cases, the first UE 115 may be designated as the primary device, and the second UE 115 may be designated as the secondary device. The base station 105 may schedule resources for sidelink communication between the first UE 115 and the second UE 115. For example, the base station 105 may transmit PDCCH 305 that may include a generic grant for sidelink communication (e.g., between multiple UE 115 pairs) or a link-specific grant for sidelink communication (e.g., between a specific UE 115 pair). In some cases, the base station 105 may multiplex the sidelink grants with uplink grants in the same subframe (e.g., using FDM techniques).

The first UE 115 and the second UE 115 may receive the sidelink grant that indicates the resources to be used for sidelink communication. In some cases, the first UE 115 may identify data to transmit to the second UE 115, and the first UE 115 may transmit RTS message 310-a to the second UE 115. In other cases, the first UE 115 may not have data to transmit to the second UE 115, and the second UE 115 may not receive an RTS message 310-a. As such, the second UE 115 may identify data to transmit to the first UE 115, and the second UE 115 may transmit an RTS message 310-b to the first UE 115. That is, the primary device (or first UE 115) has a higher priority to transmit data over the sidelink connection than the secondary device (or second UE 115). However, if the primary device does not have data to transmit to the secondary device, the secondary device may transmit data to the primary device. The device that transmits the RTS message 310 may be referred to as the transmitting device, and the other device may be referred to as the receiving device.

The RTS message 310 from the transmitting device may include a destination ID, a duration of the data transmission, and a reference signal. The receiving device may use the reference signal to perform and report channel measurements (e.g., CQI). In some cases, other devices may receive the RTS message 310 from the transmitting device, and these devices may use the reference signal to determine whether to perform Rx yielding. That is, other devices may determine whether to refrain from listening for their respective data transmissions for the duration of the data transmission since the data transmission may be associated with a higher priority than other data transmissions and may cause substantial interference to the other data transmissions.

The receiving device may then transmit a CTS message 315 in response to receiving the RTS message 310. In some cases, the power used to transmit the CTS message 315 may be inversely proportional to the power used to transmit the RTS message 310. By using the inverse of the power used to transmit the RTS message 310 for the transmission of the CTS message 315, the receiving device may increase spatial reuse (i.e., reduce interference) in a wireless communications system while maintaining the reliability of the transmission of the CTS message 315. The CTS message 315 may include a source ID, a duration of the data transmission, an SINR (or CQI) determined based on the reference signal in the RTS message 310, and a reference signal. In some cases, other devices may receive the CTS message 315 from the receiving device, and these devices may use the reference signal to determine whether to perform Tx yielding. That is, other devices may determine whether to refrain from transmitting their respective data transmissions for the duration of the data transmission since the data transmission may be associated with a higher priority than other data transmissions and may cause substantial interference to the other data transmissions.

The transmitting device may then transmit the data to the receiving device over PSSCH 320. The MCS used for the data transmission may be determined based on the CQI received in the CTS message 315. As discussed above with reference to FIGS. 1 and 2, the power used to transmit the data over PSSCH 320 may be different from the power used to transmit the RTS message 310. The transmitting device may determine the transmit power for the data transmission based on instantaneous CQI, the MCS, a threshold power for Tx yielding, etc. The receiving device may then transmit a HARQ message (e.g., acknowledgement (ACK)/NACK) over PSHICH 325 in response to receiving the data transmission over PSSCH 320. The resources allocated for uplink burst 330 may be used by multiple UEs 115 in a wireless communications system to transmit signals to a base station 105 in order to maintain a connection with the base station 105 (e.g., for nominal traffic reporting purposes).

Figure 4:
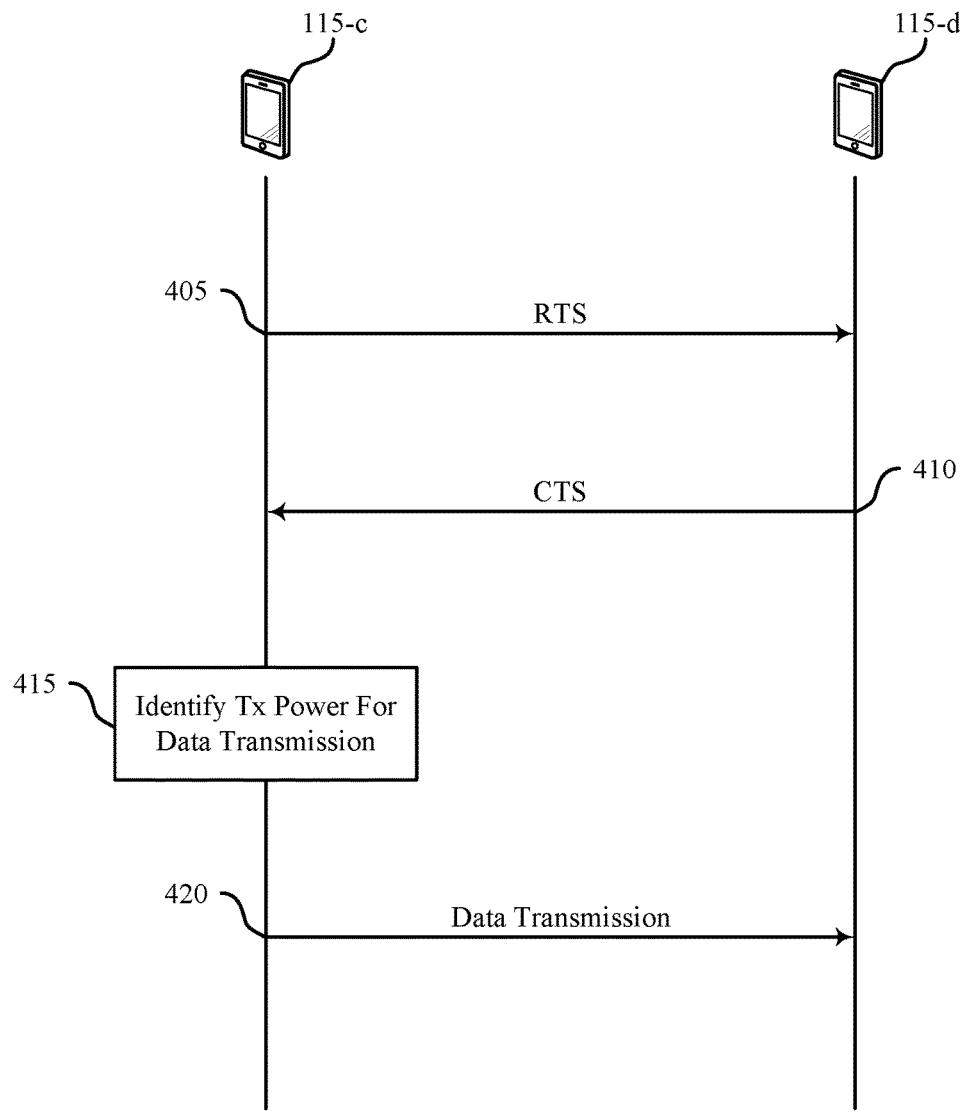
FIG. 4 illustrates an example of a process flow in a wireless communications system that supports power-adaptive sidelink data transmissions, in accordance with one or more aspects of the present disclosure.

FIG. 4 illustrates an example of a process flow 400 in a wireless communications system (e.g., mmW system or a sub-6 GHz system) that supports power-adaptive sidelink data transmissions, in accordance with one or more aspects of the present disclosure. Process flow 400 may represent aspects of techniques performed by a UE 115-c and UE 115-d, which may be examples of a UE 115 described with reference to FIGS. 1 and 2. In this example, UE 115-c may be referred to as the transmitting device, and UE 115-d may be referred to as the receiving device.

At 405, UE 115-c may transmit an RTS message with a first transmit power to UE 115-d over a sidelink connection with UE 115-d. UE 115-c may determine the first transmit power used to transmit the RTS message based on a history of CQI. The RTS message may be used to indicate that UE 115-c has data to transmit to UE 115-d. In some cases, the RTS message may include a reference signal. The RTS message may also include a destination ID and a duration for the data transmission.

At 410, UE 115-d may determine and report CQI to UE 115-c based on the RTS message received at 405. Specifically, UE 115-d may determine and report CQI (or an SINR) based on the reference signal included in the RTS message received at 405. UE 115-d may include the CQI in a CTS message in response to the RTS message. In some cases, the power used to transmit the CTS message may be inversely proportional to the power used to transmit the RTS message. This may increase spatial reuse by reducing the amount of interference from the transmission of the CTS message since, in some cases, the transmission of the CTS message may silence neighboring communications.

At 415, UE 115-c may determine to refrain from using the first transmit power for the data transmission, and UE 115-c may identify a second transmit power for the data transmission. The second transmit power may be less than the first transmit power. In some examples, UE 115-c may identify the second transmit power for the data transmission based on the CQI received in the CTS at 410 (e.g., instantaneous CQI). In other examples, UE 115-c may identify an MCS for the data transmission and identify the second transmit power based on the MCS. The data transmission may be a portion of a larger data transmission. In yet other examples, UE 115-c may identify a threshold power for the data transmission based on neighboring communications and identify the second transmit power based on the threshold power. The neighboring communications may be associated with a higher priority than the data transmission.

At 420, UE 115-c may transmit the data transmission with the second transmit power to UE 115-d over the sidelink connection with UE 115-d. By using a different (e.g., lower) transmit power for the data transmission, UE 115-c may reduce power consumption and reduce interference with neighboring communications.

Figure 5:
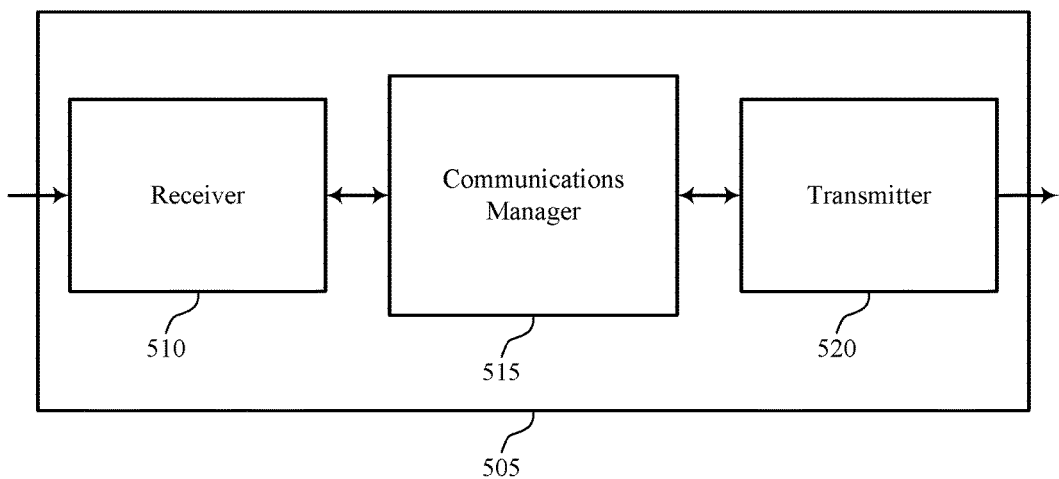
FIGS. 5 and 6 show block diagrams of wireless devices that support power-adaptive sidelink data transmissions, in accordance with one or more aspects of the present disclosure.

FIG. 5 shows a block diagram 500 of a wireless device 505 that supports power-adaptive sidelink data transmissions, in accordance with one or more aspects of the present disclosure. Wireless device 505 may be an example of aspects of a UE 115 as described with reference to FIGS. 1 through 4 and may operate in a wireless communications system, such as an mmW system or a sub-6 GHz system. Wireless device 505 may include receiver 510, communications manager 515, and transmitter 520. Wireless device 505 may also include a processor. Each of these components may be in communication with one another (e.g., via one or more buses).

Receiver 510 may receive information such as packets, user data, or control information associated with various information channels (e.g., control channels, data channels, and information related to power-adaptive sidelink data transmissions, etc.). Information may be passed on to other components of the device. The receiver 510 may be an example of aspects of the transceiver 835 described with reference to FIG. 8.

Communications manager 515 may be an example of aspects of the communications manager 815 described with reference to FIG. 8. Communications manager 515 and/or at least some of its various sub-components may be implemented in hardware, software executed by a processor, firmware, or any combination thereof. If implemented in software executed by a processor, the functions of the communications manager 515 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 515 and/or at least some of its various sub-components may be physically located at various positions, including being distributed such that portions of functions are implemented at different physical locations by one or more physical devices. In some examples, communications manager 515 and/or at least some of its various sub-components may be a separate and distinct component in accordance with one or more aspects of the present disclosure. In other examples, communications manager 515 and/or at least some of its various sub-components may be combined with one or more other hardware components, including but not limited to a receiver, a transmitter, a transceiver, one or more other components described in the present disclosure, or a combination thereof in accordance with one or more aspects of the present disclosure.

Communications manager 515 may transmit an RTS message with a first transmit power to a receiving device over a sidelink connection with the receiving device, determine to refrain from using the first transmit power for a data transmission, identify a second transmit power for the data transmission (e.g., that is less than the first transmit power), and transmit the data transmission with the second transmit power to the receiving device over the sidelink connection with the receiving device. The communications manager 515 may also receive an RTS message with a first transmit power from a transmitting device over a sidelink connection with the transmitting device and receive a data transmission with a second transmit power from the transmitting device over the sidelink connection with the transmitting device, where the second transmit power is different from the first transmit power.

Transmitter 520 may transmit signals generated by other components of the device. In some examples, the transmitter 520 may be collocated with a receiver 510 in a transceiver module. For example, the transmitter 520 may be an example of aspects of the transceiver 835 described with reference to FIG. 8. The transmitter 520 may include a single antenna, or it may include a set of antennas.

Figure 6:
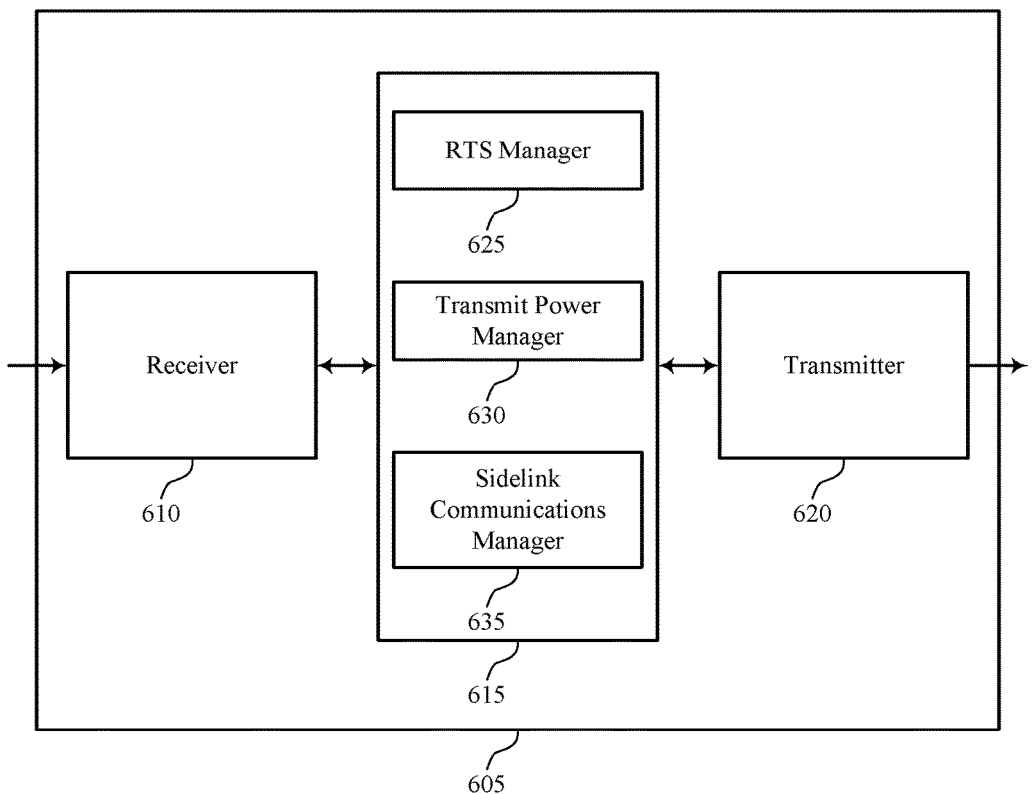

FIG. 6 shows a block diagram 600 of a wireless device 605 that supports power-adaptive sidelink data transmissions, in accordance with one or more aspects of the present disclosure. Wireless device 605 may be an example of aspects of a wireless device 505 or a UE 115 as described with reference to FIGS. 1 through 5 and may operate in a wireless communications system, such as an mmW system or a sub-6 GHz system. Wireless device 605 may include receiver 610, communications manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to power-adaptive sidelink data transmissions, etc.). Information may be passed on to other components of the device. The receiver 610 may be an example of aspects of the transceiver 835 described with reference to FIG. 8.

Communications manager 615 may be an example of aspects of the communications manager 815 described with reference to FIG. 8. Communications manager 615 may include RTS manager 625, transmit power manager 630, and sidelink communications manager 635.

RTS manager 625 may transmit an RTS message with a first transmit power to a receiving device over a sidelink connection with the receiving device. RTS manager 625 may also receive an RTS message with a first transmit power from a transmitting device over a sidelink connection with the transmitting device. In some cases, the RTS message includes a reference signal.

Transmit power manager 630 may determine to refrain from using the first transmit power for a data transmission and identify a second transmit power for the data transmission. In some cases, the second transmit power is less than the first transmit power. In some examples, transmit power manager 630 may identify the second transmit power for the data transmission based on CQI, an MCS, and/or an identified threshold power. In some cases, the data transmission includes a portion of a larger data transmission.

Sidelink communications manager 635 may transmit the data transmission with the second transmit power to the receiving device over the sidelink connection with the receiving device. Sidelink communications manager 635 may also receive a data transmission with a second transmit power from the transmitting device over the sidelink connection with the transmitting device, where the second transmit power is different from the first transmit power. In some cases, the second transmit power is less than the first transmit power.

Transmitter 620 may transmit signals generated by other components of the device. In some examples, the transmitter 620 may be collocated with a receiver 610 in a transceiver module. For example, the transmitter 620 may be an example of aspects of the transceiver 835 described with reference to FIG. 8. The transmitter 620 may include a single antenna, or it may include a set of antennas.

Figure 7:
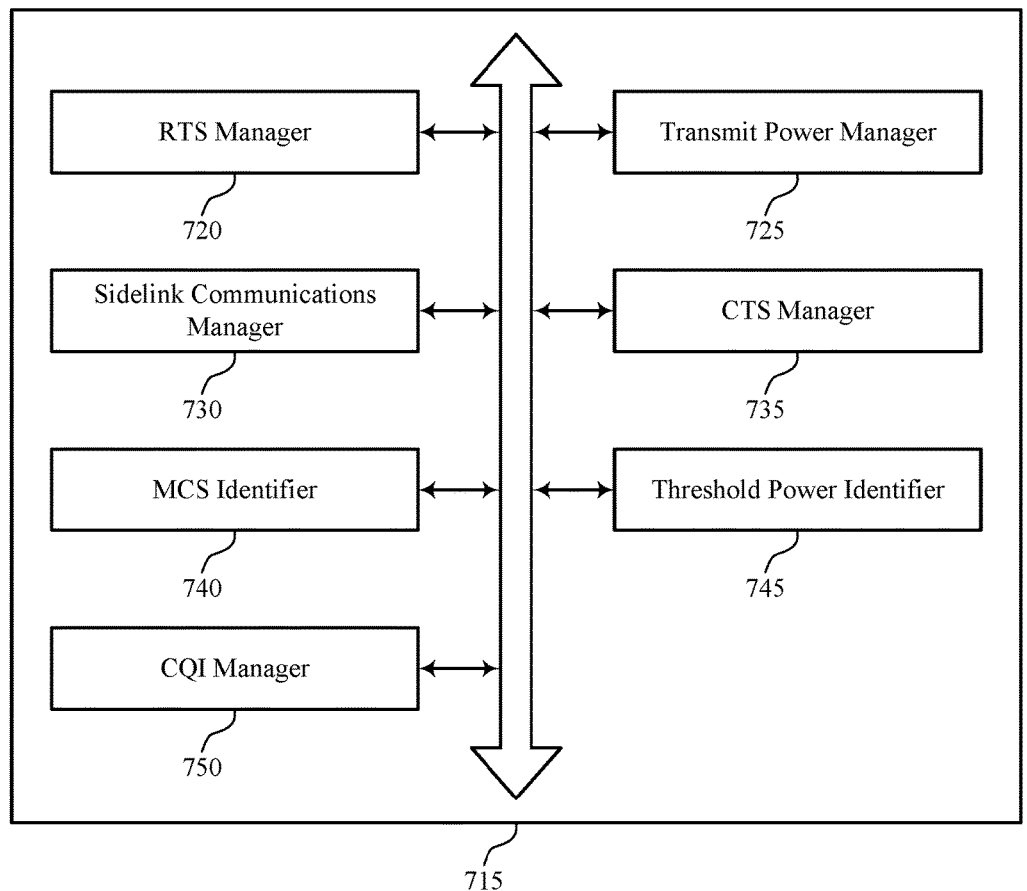
FIG. 7 shows a block diagram of a communications manager that supports power-adaptive sidelink data transmissions, in accordance with one or more aspects of the present disclosure.

FIG. 7 shows a block diagram 700 of a communications manager 715 that supports power-adaptive sidelink data transmissions, in accordance with one or more aspects of the present disclosure. The communications manager 715 may be an example of aspects of a communications manager 515, a communications manager 615, or a communications manager 815 described with reference to FIGS. 5, 6, and 8. The communications manager 715 may include RTS manager 720, transmit power manager 725, sidelink communications manager 730, CTS manager 735, MCS identifier 740, threshold power identifier 745, and CQI manager 750. Each of these modules may communicate, directly or indirectly, with one another (e.g., via one or more buses).

RTS manager 720 may transmit an RTS message with a first transmit power to a receiving device over a sidelink connection with the receiving device. RTS manager 720 may also receive an RTS message with a first transmit power from a transmitting device over a sidelink connection with the transmitting device. In some cases, the RTS message includes a reference signal.

Transmit power manager 725 may determine to refrain from using the first transmit power for a data transmission and identify a second transmit power for the data transmission. In some cases, transmit power manager 725 may identify the second transmit power for the data transmission based on CQI, an MCS, and/or an identified threshold power. In some cases, the data transmission includes a portion of a larger data transmission. In some cases, the second transmit power is less than the first transmit power.

Sidelink communications manager 730 may transmit the data transmission with the second transmit power to the receiving device over the sidelink connection with the receiving device. Sidelink communications manager 730 may also receive a data transmission with a second transmit power from the transmitting device over the sidelink connection with the transmitting device, where the second transmit power is different from the first transmit power. In some cases, the second transmit power is less than the first transmit power.

CTS manager 735 may receive a CTS message from the receiving device in response to the RTS message, where the CTS message includes CQI. CTS manager 735 may also transmit CQI in a CTS message to the transmitting device. MCS identifier 740 may identify an MCS for the data transmission. Threshold power identifier 745 may identify a threshold power for the data transmission based on neighboring communications. In some cases, the neighboring communications are associated with a higher priority than the data transmission. CQI manager 750 may determine CQI based on the RTS message.

Figure 8:
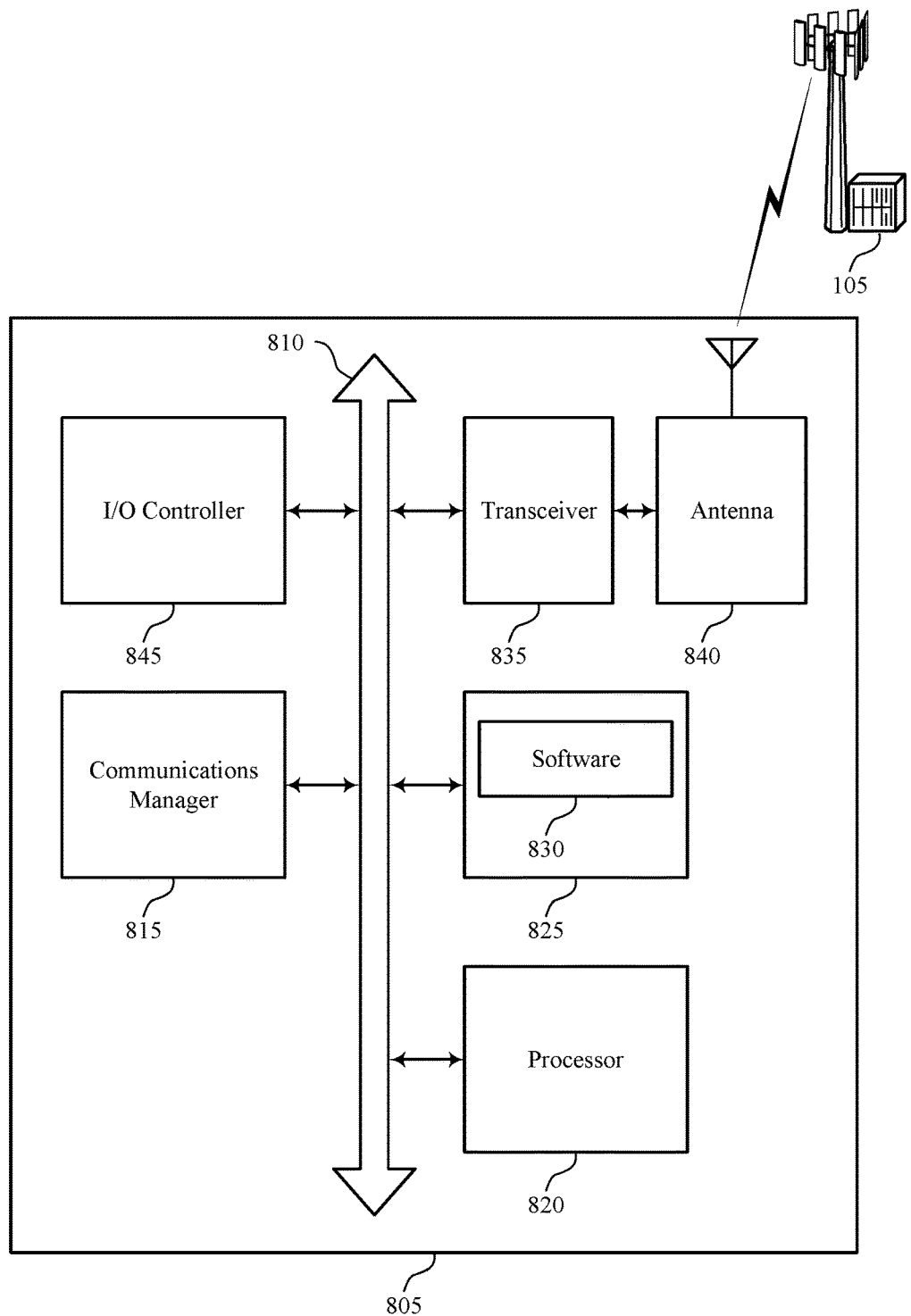
FIG. 8 shows a diagram of a system including a device that supports power-adaptive sidelink data transmissions, in accordance with one or more aspects of the present disclosure.

FIG. 8 shows a diagram of a system 800 including a device 805 that supports power-adaptive sidelink data transmissions, in accordance with one or more aspects of the present disclosure. Device 805 may be an example of or include the components of wireless device 505, wireless device 605, or a UE 115 as described above, e.g., with reference to FIGS. 1, 5 and 6. Device 805 may include components for bi-directional voice and data communications including components for transmitting and receiving communications, including communications manager 815, processor 820, memory 825, software 830, transceiver 835, antenna 840, and I/O controller 845. These components may be in electronic communication via one or more busses (e.g., bus 810). Device 805 may communicate wirelessly with one or more base stations 105.

Processor 820 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 820 may be configured to operate a memory array using a memory controller. In other cases, a memory controller may be integrated into processor 820. Processor 820 may be configured to execute computer-readable instructions stored in a memory to perform various functions (e.g., functions or tasks supporting power-adaptive sidelink data transmissions).

Memory 825 may include random access memory (RAM) and read only memory (ROM). The memory 825 may store computer-readable, computer-executable software 830 including instructions that, when executed, cause the processor to perform various functions described herein. In some cases, the memory 825 may contain, among other things, a basic input/output system (BIOS) which may control basic hardware and/or software operation such as the interaction with peripheral components or devices.

Software 830 may include code to implement aspects of the present disclosure, including code to support power-adaptive sidelink data transmission. Software 830 may be stored in a non-transitory computer-readable medium such as system memory or other memory. In some cases, the software 830 may not be directly executable by the processor but may cause a computer (e.g., when compiled and executed) to perform functions described herein.

Transceiver 835 may communicate bi-directionally, via one or more antennas, wired, or wireless links as described above. For example, the transceiver 835 may represent a wireless transceiver and may communicate bi-directionally with another wireless transceiver. The transceiver 835 may also include a modem to modulate the packets and provide the modulated packets to the antennas for transmission, and to demodulate packets received from the antennas.

In some cases, the wireless device may include a single antenna 840. However, in some cases the device may have more than one antenna 840, which may be capable of concurrently transmitting or receiving multiple wireless transmissions.

I/O controller 845 may manage input and output signals for device 805. I/O controller 845 may also manage peripherals not integrated into device 805. In some cases, I/O controller 845 may represent a physical connection or port to an external peripheral. In some cases, I/O controller 845 may utilize an operating system such as iOS®, ANDROID®, MS-DOS®, MS-WINDOWS®, OS/2®, UNIX®, LINUX®, or another known operating system.

Figure 9:
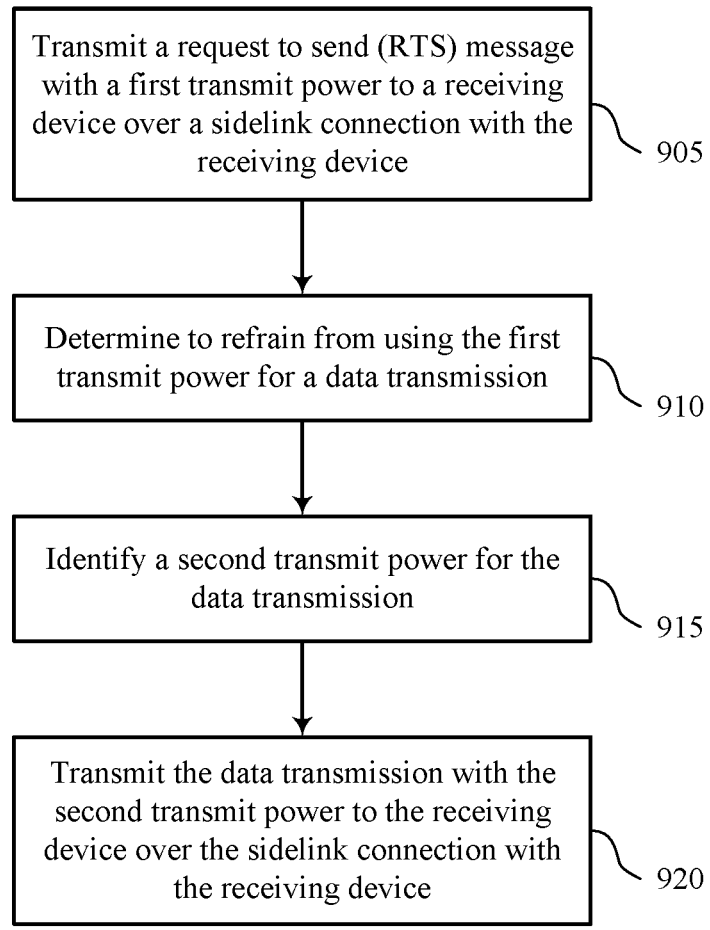
FIGS. 9 through 11 show flowcharts illustrating methods for power-adaptive sidelink data transmissions, in accordance with one or more aspects of the present disclosure.

FIG. 9 shows a flowchart illustrating a method 900 for power-adaptive sidelink data transmissions, in accordance with one or more aspects of the present disclosure. The operations of method 900 may be implemented by a UE 115 or its components as described herein. For example, the operations of method 900 may be performed by a communications manager as described with reference to FIGS. 5 through 8. In some examples, a UE 115 may execute a set of codes to control the functional elements of the device to perform the functions described below. Additionally or alternatively, the UE 115 may perform aspects of the functions described below using special-purpose hardware.

At 905, the UE 115 may transmit an RTS message with a first transmit power to a receiving device over a sidelink connection with the receiving device. The operations of 905 may be performed according to the methods described with reference to FIGS. 1 through 4. In certain examples, aspects of the operations of 905 may be performed by an RTS manager as described with reference to FIGS. 5 through 8.

At 910, the UE 115 may determine to refrain from using the first transmit power for a data transmission. The operations of 910 may be performed according to the methods described with reference to FIGS. 1 through 4. In certain examples, aspects of the operations of 910 may be performed by a transmit power manager as described with reference to FIGS. 5 through 8.

At 915, the UE 115 may identify a second transmit power for the data transmission. The operations of 915 may be performed according to the methods described with reference to FIGS. 1 through 4. In certain examples, aspects of the operations of 915 may be performed by a transmit power manager as described with reference to FIGS. 5 through 8.

At 920, the UE 115 may transmit the data transmission with the second transmit power to the receiving device over the sidelink connection with the receiving device. The operations of 920 may be performed according to the methods described with reference to FIGS. 1 through 4. In certain examples, aspects of the operations of 920 may be performed by a sidelink communications manager as described with reference to FIGS. 5 through 8.

Figure 10:
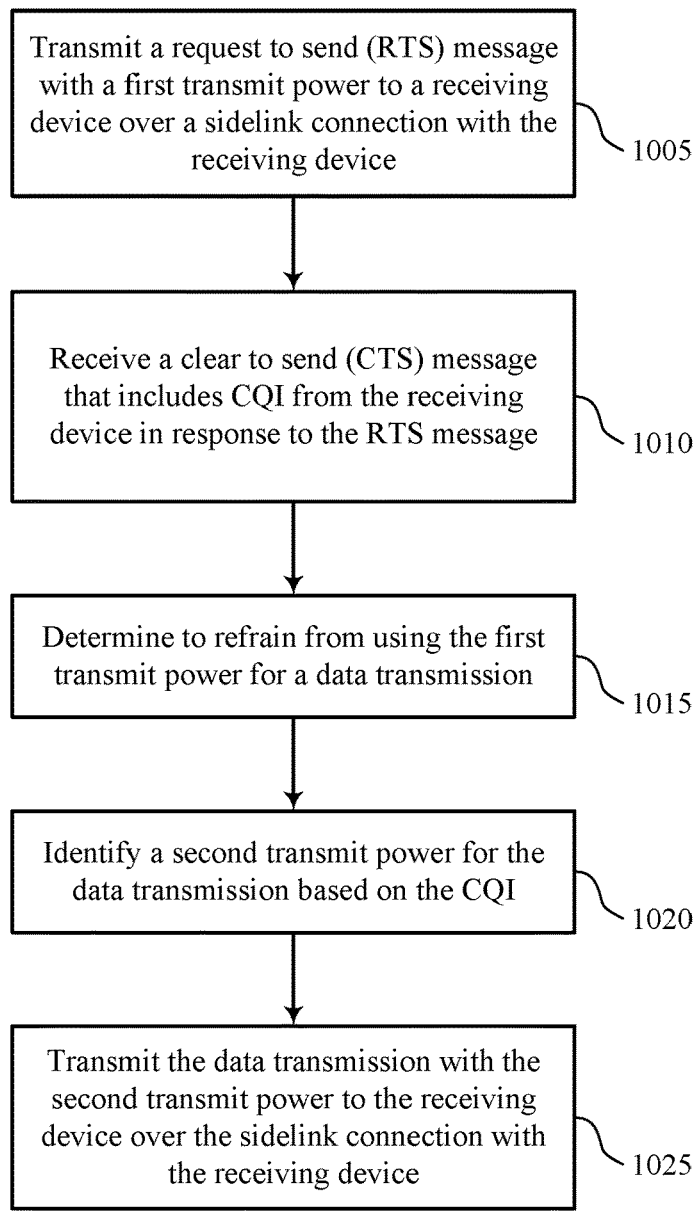

FIG. 10 shows a flowchart illustrating a method 1000 for power-adaptive sidelink data transmissions, in accordance with one or more aspects of the present disclosure. The operations of method 1000 may be implemented by a UE 115 or its components as described herein. For example, the operations of method 1000 may be performed by a communications manager as described with reference to FIGS. 5 through 8. In some examples, a UE 115 may execute a set of codes to control the functional elements of the device to perform the functions described below. Additionally or alternatively, the UE 115 may perform aspects of the functions described below using special-purpose hardware.

At 1005, the UE 115 may transmit an RTS message with a first transmit power to a receiving device over a sidelink connection with the receiving device. The operations of 1005 may be performed according to the methods described with reference to FIGS. 1 through 4. In certain examples, aspects of the operations of 1005 may be performed by an RTS manager as described with reference to FIGS. 5 through 8.

At 1010, the UE 115 may receive a CTS message from the receiving device in response to the RTS message, where the CTS message includes CQI. The operations of 1010 may be performed according to the methods described with reference to FIGS. 1 through 4. In certain examples, aspects of the operations of 1010 may be performed by a CTS manager as described with reference to FIGS. 5 through 8.

At 1015, the UE 115 may determine to refrain from using the first transmit power for a data transmission. The operations of 1015 may be performed according to the methods described with reference to FIGS. 1 through 4. In certain examples, aspects of the operations of 1015 may be performed by a transmit power manager as described with reference to FIGS. 5 through 8.

At 1020, the UE 115 may identify a second transmit power for the data transmission based on the CQI. The operations of 1020 may be performed according to the methods described with reference to FIGS. 1 through 4. In certain examples, aspects of the operations of 1020 may be performed by a transmit power manager as described with reference to FIGS. 5 through 8.

At 1025, the UE 115 may transmit the data transmission with the second transmit power to the receiving device over the sidelink connection with the receiving device. The operations of 1025 may be performed according to the methods described with reference to FIGS. 1 through 4. In certain examples, aspects of the operations of 1025 may be performed by a sidelink communications manager as described with reference to FIGS. 5 through 8.

Figure 11:
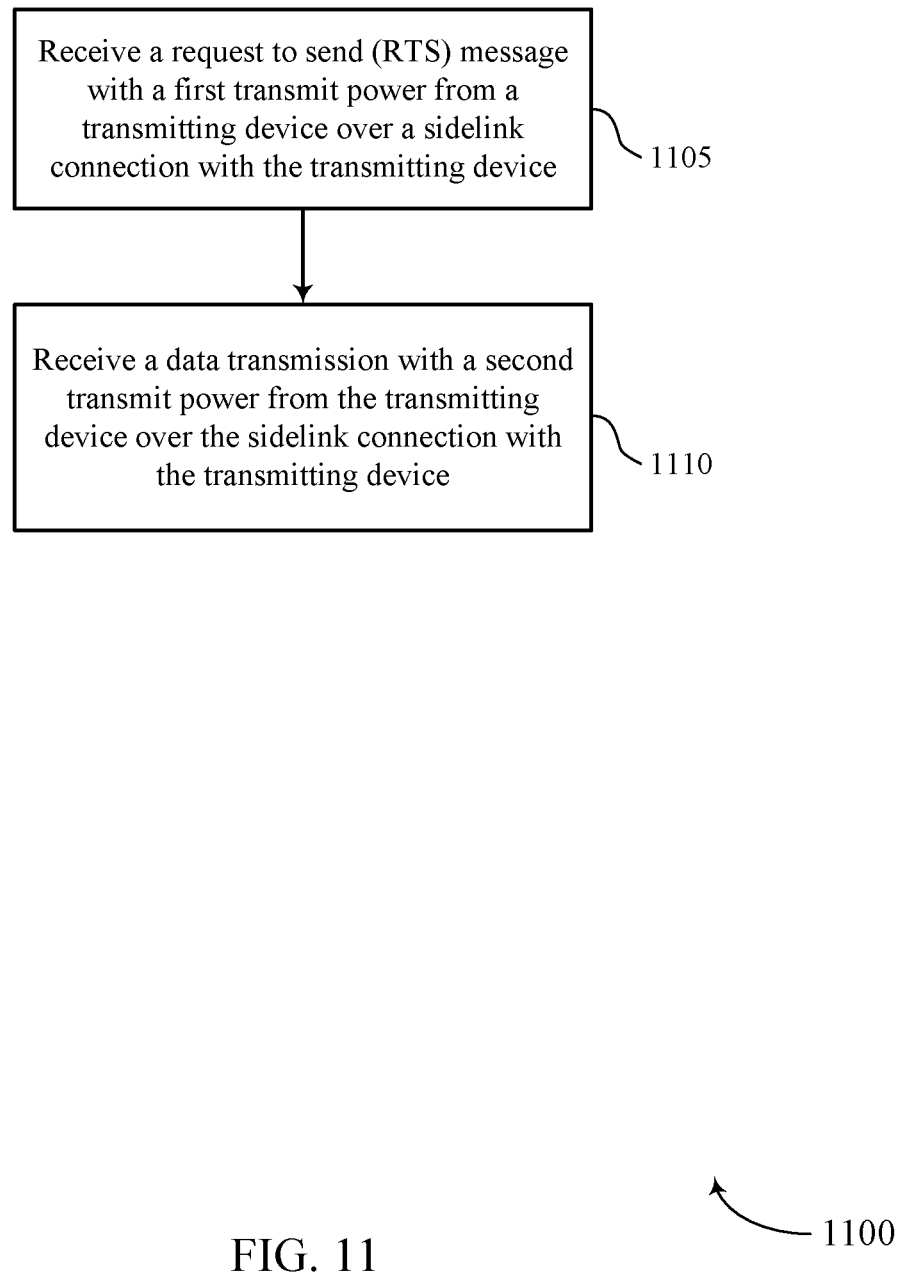

FIG. 11 shows a flowchart illustrating a method 1100 for power-adaptive sidelink data transmissions, in accordance with one or more aspects of the present disclosure. The operations of method 1100 may be implemented by a UE 115 or its components as described herein. For example, the operations of method 1100 may be performed by a communications manager as described with reference to FIGS. 5 through 8. In some examples, a UE 115 may execute a set of codes to control the functional elements of the device to perform the functions described below. Additionally or alternatively, the UE 115 may perform aspects of the functions described below using special-purpose hardware.

At 1105, the UE 115 may receive an RTS message with a first transmit power from a transmitting device over a sidelink connection with the transmitting device. The operations of 1105 may be performed according to the methods described with reference to FIGS. 1 through 4. In certain examples, aspects of the operations of 1105 may be performed by an RTS manager as described with reference to FIGS. 5 through 8.

At 1110, the UE 115 may receive a data transmission with a second transmit power from the transmitting device over the sidelink connection with the transmitting device, where the second transmit power is different from the first transmit power. The operations of 1110 may be performed according to the methods described with reference to FIGS. 1 through 4. In certain examples, aspects of the operations of 1110 may be performed by a sidelink communications manager as described with reference to FIGS. 5 through 8.

It should be noted that the methods described above describe possible implementations, and that the operations may be rearranged or otherwise modified and that other implementations are possible. Furthermore, aspects from two or more of the methods may be combined.

Techniques described herein may be used for various wireless communications systems such as CDMA, TDMA, FDMA, OFDMA, single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP LTE and LTE-Advanced (LTE-A) are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of eNBs provide coverage for various geographical regions. For example, each eNB, gNB, or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNB, gNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A gNB for a macro cell may be referred to as a macro gNB. A gNB for a small cell may be referred to as a small cell gNB, a pico gNB, a femto gNB, or a home gNB. A gNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary operation that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication in a wireless communications system, comprising:
   transmitting a request to send (RTS) message with a first transmit power to a receiving device over a sidelink connection with the receiving device;
   receiving a clear to send (CTS) message from the receiving device in response to the RTS message, wherein the CTS message is transmitted with a power that is inversely proportional to a power associated with the RTS message;
   determining to refrain from using the first transmit power for a data transmission;
   identifying a second transmit power for the data transmission based at least in part on the received CTS message; and
   transmitting the data transmission with the second transmit power to the receiving device over the sidelink connection with the receiving device.

2. The method of claim 1, further comprising:
   identifying a threshold power for the data transmission based at least in part on neighboring communications; and
   identifying the second transmit power for the data transmission based at least in part on the identified threshold power.

3. The method of claim 2, wherein the neighboring communications are associated with a higher priority than the data transmission.

4. The method of claim 1, further comprising:
   identifying, in the CTS message, channel quality information (CQI) associated with the RTS message; and
   identifying the second transmit power for the data transmission based at least in part on the CQI.

5. The method of claim 1, further comprising:
   identifying a modulation and coding scheme (MCS) for the data transmission; and
   identifying the second transmit power for the data transmission based at least in part on the MCS.

6. The method of claim 5, wherein the data transmission comprises a portion of a larger data transmission.

7. The method of claim 1, wherein the second transmit power is less than the first transmit power.

8. The method of claim 1, wherein the RTS message comprises a reference signal.

9. The method of claim 1, wherein the wireless communications system comprises a millimeter wave (mmW) system or a sub6 GHz system.

10. A method for wireless communication in a wireless communications system, comprising:
receiving a request to send (RTS) message from a transmitting device over a sidelink connection with the transmitting device, the RTS message transmitted by the transmitting device with a first transmit power;
transmitting a clear to send (CTS) message to the transmitting device based at least in part on receiving the RTS message, wherein the CTS message is transmitted with a power that is inversely proportional to a power associated with the RTS message; and
receiving a data transmission from the transmitting device over the sidelink connection with the transmitting device, the data transmission transmitted by the transmitting device with a second transmit power that is different from the first transmit power.

11. The method of claim 10, further comprising:
determining channel quality information (CQI) based at least in part on the RTS message; and
transmitting the CQI in the CTS message to the transmitting device.

12. The method of claim 10; wherein the CTS message comprises an indication of a priority of the data transmission.

13. The method of claim 10, wherein the second transmit power is less than the first transmit power.

14. The method of claim 10, wherein the wireless communications system comprises a millimeter wave (mmW) system or a sub6 GHz system.

15. The method of claim 10, wherein the RTS message comprises a reference signal.

16. An apparatus for wireless communication in a wireless communications system, comprising:
a processor;
memory in electronic communication with the processor; and
the processor and memory configured to:
transmit a request to send (RTS) message with a first transmit power to a receiving device over a sidelink connection with the receiving device;
receive a clear to send (CTS) message from the receiving device in response to the RTS message, wherein the CTS message is transmitted with a power that is inversely proportional to a power associated with the RTS message;
determine to refrain from using the first transmit power for a data transmission;
identify a second transmit power for the data transmission based at least in part on the received CTS message; and
transmit the data transmission with the second transmit power to the receiving device over the sidelink connection with the receiving device.

17. The apparatus of claim 16, wherein the processor and memory are further configured to:
identify a threshold power for the data transmission based at least in part on neighboring communications; and
identify the second transmit power for the data transmission based at least in part on the identified threshold power.

18. The apparatus of claim 17, wherein the neighboring communications are associated with a higher priority than the data transmission.

19. The apparatus of claim 16, wherein the processor and memory are further configured to:
identify, in the CTS message, channel quality information (CQI) associated with the RTS message; and
the processor and memory are configured to identify the second transmit power for the data transmission based at least in part on the ON.

20. The apparatus of claim 16, wherein the processor and memory are further configured to:
identify a modulation and coding scheme (MCS) for the data transmission; and
identify the second transmit power for the data transmission based at least in part on the MCS.

21. The apparatus of claim 20, wherein the data transmission comprises a portion of a larger data transmission.

22. The apparatus of claim 16, wherein the second transmit power is less than the first transmit power.

23. The apparatus of claim 16, wherein the wireless communications system comprises a millimeter wave (mmW) system or a sub6 GHz system.

24. An apparatus for wireless communication in a wireless communications system; comprising:
a processor;
memory in electronic communication with the processor; and
the processor and memory configured to:
receive a request to send (RTS) message from a transmitting device over a sidelink connection with the transmitting device, the RTS message transmitted by the transmitting device with a first transmit power;
transmit a clear to send (CTS) message to the transmitting device based at least in part on receiving the RTS message, wherein the CTS message is transmitted with a power that is inversely proportional to a power associated with the RTS message; and
receive a data transmission from the transmitting device over the sidelink connection with the transmitting device; the data transmission transmitted by the transmitting device with a second transmit power that is different from the first transmit power.

25. The apparatus of claim 24, wherein the processor and memory are further configured to:
determine channel quality information (CQI) based at least in part on the RTS message; and
transmit the CQI in the CTS message to the transmitting device.

26. The apparatus of claim 24, wherein the CTS message comprises an indication of a priority of the data transmission.

27. The apparatus of claim 24, wherein the second transmit power is less than the first transmit power.

28. The apparatus of claim 24, wherein the wireless communications system comprises a millimeter wave (mmW) system or a sub6 GHz system.

* * * * *